United States Patent [19]

Iizuka et al.

[11] 4,192,278
[45] Mar. 11, 1980

[54] INTERNAL COMBUSTION ENGINE FOR MOTOR VEHICLE

[75] Inventors: Haruhiko Iizuka, Yokosuka; Fukashi Sugasawa, Yokohama; Junichiro Matsumoto, Yokosuka; Yukihiro Etoh, Yokohama, all of Japan

[73] Assignee: Nissan Motor Company, Limited, Yokohama, Japan

[21] Appl. No.: 965,994

[22] Filed: Dec. 4, 1978

[30] Foreign Application Priority Data

Dec. 18, 1977 [JP] Japan ............................ 52-170813[U]

[51] Int. Cl.² ........................................... F02D 17/02
[52] U.S. Cl. ............................... 123/198 F; 123/119 A; 123/97 B
[58] Field of Search ............ 123/198 F, 97 B, 119 A, 123/198 D, 198 B

[56] References Cited

U.S. PATENT DOCUMENTS

| | | | |
|---|---|---|---|
| 2,085,818 | 7/1937 | Messingu | 123/198 F |
| 3,958,900 | 5/1976 | Veno | 123/198 F |
| 4,064,861 | 12/1977 | Schulz | 123/198 F |
| 4,106,471 | 8/1978 | Nakajima et al. | 123/198 F |
| 4,107,921 | 8/1978 | Iizuka | 123/198 F |
| 4,114,374 | 9/1978 | Tanahashi | 123/198 F |
| 4,124,012 | 11/1978 | Fuller | 123/198 P |
| 4,143,635 | 3/1979 | Iizuka et al. | 123/198 F |

Primary Examiner—Ira S. Lazarus
Attorney, Agent, or Firm—Lane, Aitken & Ziems

[57] ABSTRACT

An internal combustion engine of the type wherein a particular group of engine cylinders are not supplied with air-fuel mixture during light load engine operation, comprises a gas supply device for supplying exhaust gas or fresh air into the particular group of cylinders when not supplied with air-fuel mixture, and a control device for stopping the supply of the exhaust gas or fresh air when a brake pedal is depressed to slow down the speed of a motor vehicle, so that engine brake becomes effective or is improved during light load engine operation.

15 Claims, 1 Drawing Figure

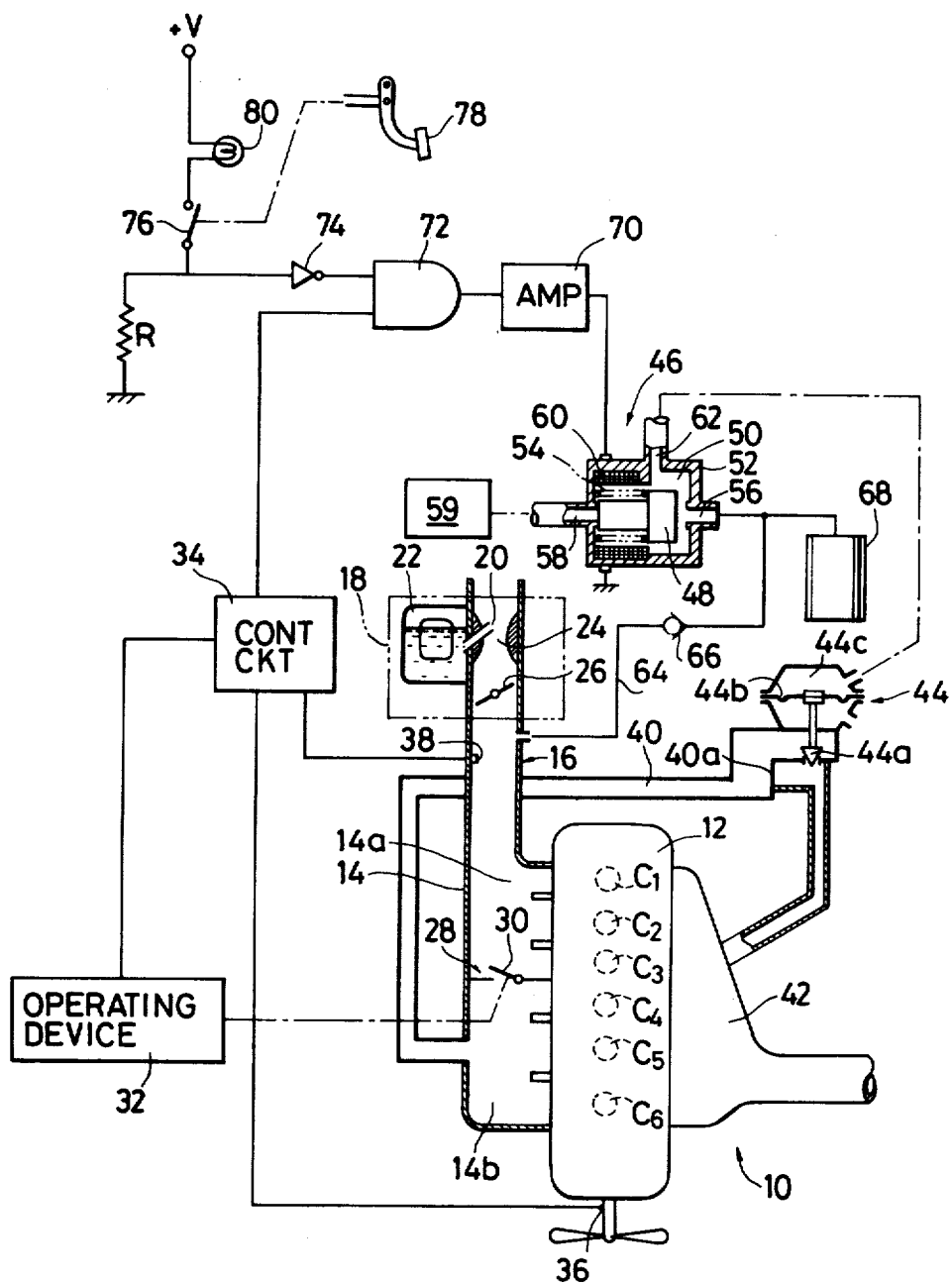

INTERNAL COMBUSTION ENGINE FOR MOTOR VEHICLE

BACKGROUND OF THE INVENTION

This invention relates generally to the improvement in an internal combustion engine of the type wherein the number of engine cylinders operated is controlled to be changed in accordance with engine operating conditions, and more particularly to a device for improving engine brake of the same engine.

In order to improve fuel economy during urban area cruising of a motor vehicle, it has already been proposed that the supply of fuel and air into some cylinders is stopped so that an engine is operated by the power generated in the remaining operated engine cylinders, during engine deceleration and light load engine operation. The number of the cylinders not operated is usually selected to be three in the case of a six-cylinder engine from a point of view of engine balancing. However, by thus stopping the fuel and air supply to the some cylinders, a high vacuum is generated in these cylinders to increase the so-called pumping loss and accordingly engine brake (brake by engine deceleration) becomes effective thereby. This provides resistance to the operation of the remaining operated cylinders which are supplied with fuel and air, unavoidably decreasing engine output power.

In this regard, it has also already been proposed that the engine cylinders not operated are supplied with fresh air or exhaust gas to decrease the pumping loss. However, even the thus arranged engine has encountered a problem in which the engine brake is not effective when brake is required to slow down the speed of the motor vehicle, because of the decreased pumping loss.

SUMMARY OF THE INVENTION

It is the prime object of the present invention to provide an improved internal combustion engine, which is excellent in fuel economy overcoming the problems encountered by prior art.

Another object of the present invention is to provide an improved internal combustion engine of the type wherein the number of the cylinders operated is controlled in accordance with engine operating conditions, in which engine brake is very effective throughout all engine operating conditions.

A still another object of the present invention is to provide an improved internal combustion engine of the type wherein the number of the cylinders operated is controlled in accordance with engine operating conditions, in which engine brake is very effective even during light load engine operation in which some cylinders are not operated.

A further object of the present invention is to provide an improved internal combustion engine of the type wherein the number of the cylinders operated is controlled in accordance with engine operating conditions, in which pumping loss of the cylinders not operated is increased, when brake is required, even during light load engine operation.

A still further object of the present invention is to provide an improved internal combustion engine of the type wherein a particular group of cylinders are supplied with exhaust gas or fresh air in place of airfuel mixture during light load engine operation, in which the supply of exhaust gas or fresh air to the particular group of cylinders is stopped when a brake pedal is depressed to slow down the speed of a motor vehicle on which the engine is mounted.

Other objects, features and advantages of the improved internal combustion engine will become more apparent from the following description taken in conjunction with the accompanying drawing.

BRIEF DESCRIPTION OF THE DRAWING

The single FIGURE is a schematic illustration of a preferred embodiment of an internal combustion engine in accordance with the present invention.

DESCRIPTION OF THE PREFERRED EMBODIMENT

Referring now to the single FIGURE, there is shown a preferred embodiment of an internal combustion engine 10 for a motor vehicle, in accordance with the present invention. The engine 10 is composed of an engine body 12 which is formed therein with in-line six cylinders $C_1$ to $C_6$. The cylinders $C_1$ to $C_3$ are referred to as a first group of cylinders, and the cylinders $C_4$ to $C_6$ are referred to as a second group of cylinders. The engine body 12 is provided with an intake manifold 14 having six branch runners (no numeral) which are communicable with cylinders $C_1$ to $C_6$. The intake manifold 14 forms part of an intake passageway 16 which provides communication between the cylinders and ambient air. Fluidly connected to the intake manifold 14 is a carburetor 18 which includes a fuel discharge nozzle 20 which discharges fuel from a fuel chamber 22 into a venturi 24. A throttle valve 26 is rotatably disposed in the intake passageway 16 downstream of the venturi 24.

A partition wall 28 is provided inside of the intake manifold 14 so as to define an upstream chamber 14a and a downstream chamber 14b. As shown, the partition wall 28 is provided with a valve member 30 which is arranged to block communication between the upstream and downstream chambers 14a and 14b when closed. The valve member 30 constitutes part of an operated cylinder number control device (no numeral) which is constructed and arranged to stop the operation of the second group of cylinders $C_4$ to $C_6$ by blocking the supply of air and fuel (air-fuel mixture) into the second group of cylinders. The valve member 30 is operatively connected to an operating device 32 for opening or closing the valve member 30 in accordance with electric signals transmitted from a control circuit 34. Accordingly, the operating device 32 is electrically connected to the control circuit 34.

The control circuit 34 is, in turn, electrically connected to an engine speed sensor 36 for sensing the engine speed and to an intake air flow sensor 38 for sensing the flow amount of the intake air passing through the intake passageway 16. The control circuit 34 is constructed and arranged to produce and transmit a first command signal to the operating device 32 when the combination of the sensors 36 and 38 sense a light load engine operation in which the intake air amount relative to the engine speed is lower than a predetermined level such as 0.2l/r.p.m. in case of an engine having a displacement of 2.8l, and to produce a second command signal when the combination of the sensors 36 and 38 sense an engine operation other than the light load engine operation. The first command signal causes the operating device 32 to operate so that the valve member 30 is closed, and the second command signal causes the operating device 32 to operate so that the valve member 30 is opened.

An EGR (Exhaust Gas Recirculation) conduit 40 is connected at one end thereof with the downstream chamber 14b of the intake manifold 14, and at the other end thereof with an exhaust manifold 42. The exhaust manifold 42 is communicable with six cylinders $C_1$ to $C_6$ to discharge engine exhaust gases out of the cylinders. The EGR conduit 40 forms part of an EGR system for recirculating a part of the engine exhaust gases back to the engine cylinders.

The reference numeral 44 represents an EGR control valve which is arranged to control the amount of the exhaust gases recirculated back to the engine cylinders. The EGR control valve 44 includes a valve head 44a which opens or closes an opening (no numeral) formed through a partition wall 40a of the EGR conduit 40. It will be understood that the communication between the intake and exhaust manifold 14 and 42 is blocked when the valve head 44a closes the opening of the partition wall 40a. The valve head 44a is securely connected to a diaphragm 44b which defines a vacuum operating chamber 44c.

A three-way solenoid valve 46 includes a movable valve member 48 disposed in a vacuum operating chamber 50 defined in a casing 52. The valve member 48 is normally biased by a spring 54 to close a vacuum inlet 56, but is also biased to close a control vacuum inlet 58 against the force of the spring 54 when a solenoid 60 is energized. The chamber 50 is communicated through a vacuum outlet 62 with the vacuum operating chamber 44c of the EGR valve 44. The vacuum inlet 56 is communicated through a vacuum line 64 with the intake passageway 16 downstream of the throttle valve 26. Disposed in the vacuum line 64 is a check valve 66. A vacuum tank 68 is fluidly connected to the vacuum line 64 between the vacuum inlet 56 and the check valve 66. The control vacuum inlet 58 is communicated with a controlled vacuum source 59 whose vacuum controllably operates the EGR control valve 44 when the valve member 48 closes the vacuum inlet 56.

The solenoid 60 of the solenoid valve 46 is electrically connected through an amplifier 70 to an AND gate 72. The AND gate 72 is, in turn, electrically connected to the control circuit 34 and an inverter 74. In this connection, the control circuit 34 is further arranged to generate and transmit a logical "1" signal into the AND gate 72 during the light load engine operation wherein the first command signal is transmitted to the operating device 32, and a logical "0" signal into the AND gate during the engine operation other than the light load engine operation. The inverter 74 is electrically connected to a brake switch 76 which is operatively connected to a brake pedal 78. The brake switch 76 is closed to supply a positive voltage (+V) to the inverter 74 when the brake pedal 78 is depressed to slow down the speed of the motor vehicle, and is opened to supply zero voltage (0 volts) to the inverter 74 when the brake pedal 78 is not depressed. In this connection, the inverter 74 inverts the electric signals from the brake switch 76 to generate a logical "0" signal when supplied with the positive voltage or the brake switch is closed, and generate a logical "1" signal when supplied with zero voltage or the brake switch is opened. The reference numeral 80 represents a brake lamp which lights when the brake switch 76 is closed.

The operation of the thus arranged engine 10 according to the present invention will be explained hereinafter.

When the engine speed sensor 36 and the intake air flow sensor 38 sense the light load engine operation, the control circuit 34 transmits the first command signal to the operating device 32 and accordingly the valve member 30 is closed to block supply of the air-fuel mixture into the second group of cylinders $C_4$ to $C_6$. At the same time, the control circuit 34 transmits a logical "1" signal to the AND gate 72.

Under such a condition, when the brake pedal 78 is not depressed, the brake switch 76 is opened and consequently the AND gate 72 is supplied with a logical "1" signal. As a result, a certain electric signal is generated in the AND gate and transmitted to the amplifier 70 to be amplified. Thereafter, the amplified electric signal is supplied to the solenoid 60 of the three-way solenoid valve 46 to energize the solenoid 60. This causes the valve member 48 to move to close the control vacuum inlet 58 and accordingly the vacuum inlet 56 and the vacuum outlet 62 communicate with each other through the chamber 50. As a result, high vacuum from the vacuum tank 68 is introduced into the vacuum chamber 44c of the EGR control valve 44 to cause the valve head 44a to move to fully open the opening of the partition wall 40a. A relatively large amount of the exhaust gases is then supplied through the downstream chamber 14b into the second group of cylinders $C_4$ to $C_6$ and therefore the pumping loss in these cylinders $C_4$ to $C_6$ is decreased. This lowers the resistance applied to the operating cylinders $C_1$ to $C_3$.

When the brake pedal 78 is depressed by an operator to slow down the speed of the motor vehicle, the brake switch 76 is closed and therefore the AND gate 72 is supplied with the logical "0" signal. As a result, the certain electric signal is not generated in the AND gate 72 so that the solenoid 60 of the solenoid valve 46 is deenergized. The valve member 48 is then moved to close the vacuum inlet 56 by the action of the spring 54 and consequently the vacuum chamber 44c of the EGR control valve 44 is supplied with a vacuum from the controlled vacuum source 59. It is to be noted that the vacuum from the controlled vacuum source 59 is kept very low or near atmospheric pressure so that the valve member 44a is maintained at a position to close the opening of the partition 40a, during engine deceleration, and therefore the engine 10 is designed to nearly stop the exhaust recirculation to the cylinders during deceleration. This manner of exhaust gas recirculation is usually used and not limited to the engine according to the present invention. Therefore, the exhaust gas supply to the second group of cylinders $C_4$ to $C_6$ is stopped, which increases the pumping loss of the second group of cylinders $C_4$ to $C_6$. As a result, engine brake becomes effective, allowing great braking effect on the motor vehicle.

As discussed above, the engine 10 in this case is arranged so that a part of engine exhaust gases is introduced into the intake manifold 14 for the purpose of decreasing the pumping loss during the engine operations other than the light load engine operation. This exhibits the following advantages: A known EGR system is usable for the above-mentioned purpose and therefore the production cost is low. Furthermore, since lowering in the exhaust gas temperature is kept less, an exhaust gas treating device, if used, is prevented from experiencing temperature drop. It will be understood that, in the case where the exhaust gas treating device is unnecessary, exhaust gas introduced into the intake manifold 14 is replaceable with air. For such a case, a portion of the EGR conduit 14 upstream of the EGR control valve 44 may be constructed to open to ambient air. Additionally, the controlled vacuum inlet 58 of the three-way solenoid valve 46 may be constructed to open to ambient air.

While only the engine 10 provided with a carburetor 18 has been shown and described, it will be understood that the principle of the present invention is applicable to engines provided with fuel injection systems. Although engine speed and intake air flow have been shown and described to be used for sensing the light load engine operation, it will be understood that other engine operating parameters, for example, venturi vacuum and throttle position are usable for the same purpose.

What is claimed is:

1. An internal combustion engine for a motor vehicle, having first and second groups of engine cylinders, comprising:
   blocking means for blocking a supply of fuel and air into the second group of engine cylinders during a predetermined engine operation, when operated;
   gas supply means for supplying a gas into the second group of cylinders during the operation of said blocking means, when operated; and
   stopping means for stopping the operation of said gas supply means when said blocking means is operated and a brake pedal is depressed to slow down the speed of the motor vehicle.

2. An internal combustion engine as claimed in claim 1, further comprising means defining an intake passageway through which the engine cylinders are communicable with ambient air, and fuel supply means for supplying fuel into the engine cylinders through said intake passageway, said fuel supply means being located to supply fuel only into the first group of cylinders when said blocking means is operated.

3. An internal combustion engine as claimed in claim 2, in which said blocking means includes valve means disposed in said intake passageway to be closable to block the supply of air and fuel into the second group of cylinders during light load engine operation.

4. An internal combustion engine as claimed in claim 3, in which gas supply means includes conduit means connected to said intake passageway to provide communication between the second group of cylinders and a gas source, and control valve means for blocking communication between the second group of engine cylinders and the gas source through said conduit means, when de-actuated.

5. An internal combustion engine as claimed in claim 4, in which said stopping means includes first operating means for de-actuating said control valve means of said gas supply means when de-actuated, and control means for de-actuating said first operating means when said valve means of said blocking means is closed and said brake pedal is depressed.

6. An internal combustion engine as claimed in claim 5, in which said blocking means further includes second operating means for closing said valve means when operated, sensing means for sensing engine operations, and a control circuit operatively connected between said second operating means and said sensing means and arranged to close said valve means when said sensing means senses the light load engine operation.

7. An internal combustion engine as claimed in claim 6, in which the intake passageway defining means includes an intake manifold communicable with the engine cylinders.

8. An internal combustion engine as claimed in claim 7, in which said valve means of said blocking means includes a valve member movably disposed at a partition wall defining the interior of said intake manifold into an upstream chamber communicable with the first group of cylinders and a downstream chamber communicable with the second group of cylinders, when said valve member is closed.

9. An internal combustion engine as claimed in claim 8, in which said fuel supply means includes a carburetor disposed to be fluidly connected to only the upstream chamber of said intake manifold when the valve member in said intake manifold is closed.

10. An internal combustion engine as claimed in claim 9, in which said conduit means of said gas supply means includes an EGR conduit connected to the downstream chamber of said intake manifold so that a part of exhaust gases of the engine is recirculated back to the second group of cylinders when the valve member in said intake manifold is closed.

11. An internal combustion engine as claimed in claim 10, in which said EGR conduit is connected to an exhaust manifold through which the exhaust gases of the engine are discharged out of the engine cylinders.

12. An internal combustion engine as claimed in claim 10, in which said control valve means of said gas supply means includes a vacuum-actuated EGR control valve operatively disposed in said EGR conduit, and arranged to be actuated to open when its vacuum operating chamber is supplied with a high vacuum, and to be de-actuated to close when its vacuum operating chamber is supplied with a pressure around atmospheric pressure.

13. An internal combustion engine as claimed in claim 12, in which said first operating means of said stopping means includes a three-way solenoid valve arranged to take a first state wherein the vacuum operating chamber of said EGR control valve is communicated with a high vacuum source when energized, and a second state wherein the vacuum operating chamber of said EGR control valve is communicated with a pressure source whose pressure is around atmospheric pressure during the light load engine operation, when de-energized.

14. An internal combustion engine as claimed in claim 13, in which said control means of said stopping means includes a brake switch which generates an electric signal when the brake pedal is depressed, a control circuit for generating an electric signal when the valve member in said intake manifold is closed, and means for generating and transmitting an electric energizing signal to the three-way solenoid valve to energize the same, when receiving both the electric signals from said brake switch and said control circuit.

15. An internal combustion engine as claimed in claim 14, in which said high vacuum source includes the intake passageway downstream of the carburetor.

* * * * *